(12) United States Patent
Palmer

(10) Patent No.: US 10,316,683 B2
(45) Date of Patent: Jun. 11, 2019

(54) GAS TURBINE ENGINE BLADE OUTER AIR SEAL THERMAL CONTROL SYSTEM

(71) Applicant: UNITED TECHNOLOGIES CORPORATION, Hartford, CT (US)

(72) Inventor: Paul W Palmer, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 875 days.

(21) Appl. No.: 14/619,419

(22) Filed: Feb. 11, 2015

(65) Prior Publication Data
US 2019/0136707 A1    May 9, 2019

Related U.S. Application Data

(60) Provisional application No. 61/980,160, filed on Apr. 16, 2014.

(51) Int. Cl.
*F01D 11/18*    (2006.01)
*F01D 25/24*    (2006.01)
*F01D 11/16*    (2006.01)
*F01D 5/02*    (2006.01)

(52) U.S. Cl.
CPC ............... *F01D 11/18* (2013.01); *F01D 5/02* (2013.01); *F01D 11/16* (2013.01); *F01D 25/24* (2013.01)

(58) Field of Classification Search
CPC . F01D 11/18; F01D 5/02; F01D 25/24; F01D 11/16

USPC ....................................................... 415/173.3
See application file for complete search history.

(56) References Cited

U.S. PATENT DOCUMENTS

| | | | |
|---|---|---|---|
| 5,593,278 A * | 1/1997 | Jourdain | F01D 11/18 415/116 |
| 5,845,289 A | 12/1998 | Baumeister et al. | |
| 6,371,874 B1 | 4/2002 | Inoue | |
| 7,553,128 B2 | 6/2009 | Abdel-Messeh et al. | |
| 7,597,533 B1 | 10/2009 | Liang | |
| 7,650,926 B2 | 1/2010 | Tholen | |
| 7,665,962 B1 | 2/2010 | Liang | |
| 7,686,068 B2 | 3/2010 | Tholen et al. | |
| 7,704,039 B1 | 4/2010 | Liang | |
| 7,771,160 B2 * | 8/2010 | Shi | F01D 9/04 415/138 |
| 7,874,792 B2 | 1/2011 | Tholen et al. | |
| 7,959,407 B2 | 6/2011 | Tholen | |
| 8,061,979 B1 | 11/2011 | Liang | |
| 8,118,547 B1 | 2/2012 | Liang | |
| 8,439,634 B1 | 5/2013 | Liang | |
| 8,439,636 B1 | 5/2013 | Liang | |
| 8,449,246 B1 | 5/2013 | Liang | |
| 8,475,122 B1 | 7/2013 | Liang | |
| 8,585,354 B1 | 11/2013 | Liang | |
| 8,585,357 B2 | 11/2013 | Di Paola et al. | |
| 8,596,962 B1 | 12/2013 | Liang | |

(Continued)

*Primary Examiner* — Aaron R Eastman
(74) *Attorney, Agent, or Firm* — Bachman & LaPointe, P.C.

(57) ABSTRACT

A clearance control system for a gas turbine engine includes a full hoop blade outer air seal carrier ring, a full hoop thermal control ring at least partially contained within the full hoop blade outer air seal blade outer air seal carrier ring to form an interference fit therebetween, and a multiple of blade outer air seals mounted to the full hoop blade outer air seal carrier ring.

20 Claims, 6 Drawing Sheets

(56) References Cited

U.S. PATENT DOCUMENTS

| | | |
|---|---|---|
| 8,613,590 B2 | 12/2013 | Belanger et al. |
| 8,622,693 B2 | 1/2014 | Di Paola et al. |
| 8,740,551 B2 | 6/2014 | Di Paola et al. |
| 8,998,572 B2 | 4/2015 | Lutjen et al. |
| 9,080,458 B2 | 7/2015 | Romanov |
| 9,115,596 B2 | 8/2015 | Clouse |
| 9,169,739 B2 | 10/2015 | Mironets et al. |
| 9,506,367 B2 | 11/2016 | Clouse |
| 2004/0071548 A1* | 4/2004 | Wilson, Jr. ............. F01D 11/18 415/173.1 |
| 2012/0275898 A1* | 11/2012 | McCaffrey ............. F01D 11/18 415/1 |
| 2013/0302185 A1* | 11/2013 | Gerard ................... F01D 11/00 417/407 |
| 2014/0186152 A1* | 7/2014 | McCaffrey ............. F01D 11/18 415/1 |
| 2016/0273376 A1* | 9/2016 | Rioux .................... F01D 11/18 |

\* cited by examiner

GAS TURBINE ENGINE BLADE OUTER AIR SEAL THERMAL CONTROL SYSTEM

CROSS REFERENCE TO RELATED APPLICATION

This application claims the benefit of provisional application Ser. No. 61/980,160, filed Apr. 16, 2014.

STATEMENT REGARDING FEDERALLY SPONSORED RESEARCH OR DEVELOPMENT

This disclosure was made with Government support under N68335-13-C-0005 awarded by The United States Navy. The Government has certain rights in this disclosure.

BACKGROUND

The present disclosure relates to a gas turbine engine and, more particularly, to a blade tip clearance control system therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases. The compressor and turbine sections include rotatable blade and stationary vane arrays. Within an engine case structure, the radial outermost tips of each blade array are positioned in close proximity to a shroud assembly. Blade outer air seals (BOAS) supported by the shroud assembly are located adjacent to the blade tips such that a radial tip clearance is defined therebetween.

When in operation, the thermal environment in the engine varies and may cause thermal expansion and contraction such that the radial tip clearance varies. The radial tip clearance may be influenced by mechanical loading, e.g., radial expansion of the blades and/or their supporting disks due to speed-dependent centrifugal loading, and thermal expansion, e.g., of the blades/disks on the one hand and the non-rotating structure on the other. The radial tip clearance is typically designed so that the blade tips do not rub against the BOAS under high power operations when the blade disk and blades expand as a result of thermal expansion and centrifugal loads. When engine power is reduced, the radial tip clearance increases. The leakage of core air between the tip of the turbine blades and the BOAS may have a negative effect on engine performance, efficiency, fuel burn, and component life.

To facilitate increased engine performance, at least some engines include a blade tip clearance control system to maintain a close radial tip clearance. One type of blade tip clearance control system is an Advanced Passive Clearance Control (APCC) system that utilizes a control ring of low thermal expansion material and a series of segmented BOAS carriers, typically 12-14 per stage, of higher thermal expansion material. The APCC facilitates a reduced blade tip gap without tip rubbing and improved fuel consumption performance. Although effective, the series of segmented BOAS carriers may result in reduced stability at the segmented carrier intersurfaces that could potentially result in non-circular support of the BOAS and blade tip rub conditions.

SUMMARY

A clearance control system for a gas turbine engine according to one disclosed non-limiting embodiment of the present disclosure includes a full hoop blade outer air seal carrier ring; a full hoop thermal control ring at least partially contained within the full hoop blade outer air seal carrier ring to form an interference fit therebetween; and a multiple of blade outer air seals mounted to the full hoop blade outer air seal carrier ring.

A further embodiment of the present disclosure includes, wherein an outer wall of the full hoop blade outer air seal carrier ring is of a smaller diameter than the full hoop thermal control ring.

A further embodiment of any of the foregoing embodiments of the present disclosure includes, wherein the interference fit is at assembly.

A further embodiment of any of the foregoing embodiments of the present disclosure includes, wherein the interference fit is at low thermal operating conditions.

A further embodiment of any of the foregoing embodiments of the present disclosure includes, wherein the interference fit is about 14 mil (0.014 inch; 0.3556 mm) on a radius of a 30 inch (762 mm) diameter full hoop thermal control ring.

A further embodiment of any of the foregoing embodiments of the present disclosure includes, wherein the interference fit is between an inner surface of the full hoop blade outer air seal carrier ring and an outer surface of the full hoop thermal control ring.

A further embodiment of any of the foregoing embodiments of the present disclosure includes, wherein the multiple of blade outer air seals locally bound a core flowpath through the gas turbine engine.

A further embodiment of any of the foregoing embodiments of the present disclosure includes a containment ring that interfaces with the full hoop blade outer air seal carrier ring.

A further embodiment of any of the foregoing embodiments of the present disclosure includes, wherein the containment ring interfaces with a case of the gas turbine engine.

A further embodiment of any of the foregoing embodiments of the present disclosure includes, wherein the containment ring interfaces with the full hoop blade outer air seal carrier ring.

A further embodiment of any of the foregoing embodiments of the present disclosure includes, wherein the full hoop blade outer air seal carrier ring forms a generally rectilinear compartment that at least partially contains the full hoop blade outer air seal carrier ring.

A further embodiment of any of the foregoing embodiments of the present disclosure includes, wherein the full hoop blade outer air seal carrier ring includes a main body with an outer wall and an inner wall interconnected by a radially extending wall, the interference fit between an inner surface of the outer wall of the full hoop blade outer air seal carrier ring, and an outer surface of the full hoop thermal control ring.

A further embodiment of any of the foregoing embodiments of the present disclosure includes, wherein the full hoop blade outer air seal carrier ring inner wall forms a forward feature and an aft feature that engage the multiple of blade outer air seals.

A clearance control system for a gas turbine engine according to another disclosed non-limiting embodiment of the present disclosure includes a containment ring; a full hoop blade outer air seal carrier ring that interfaces with the containment ring; and a full hoop thermal control ring at least partially contained within the full hoop blade outer air seal carrier ring to form an interference fit therebetween.

A further embodiment of any of the foregoing embodiments of the present disclosure includes, a multiple of blade outer air seals mounted to the full hoop blade outer air seal carrier ring.

A further embodiment of any of the foregoing embodiments of the present disclosure includes, wherein the full hoop blade outer air seal carrier ring interfaces with the containment ring.

A further embodiment of any of the foregoing embodiments of the present disclosure includes, wherein the interference fit is at assembly.

A method of assembling a clearance control system for a gas turbine engine according to another disclosed non-limiting embodiment of the present disclosure includes assembling a full hoop thermal control ring at least partially within a full hoop blade outer air seal carrier ring to form an interference fit therebetween at assembly.

A further embodiment of any of the foregoing embodiments of the present disclosure includes, assembling the full hoop blade outer air seal carrier ring to a containment ring.

A further embodiment of any of the foregoing embodiments of the present disclosure includes, enclosing the full hoop thermal control ring within a generally rectilinear compartment formed by the full hoop blade outer air seal carrier ring.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
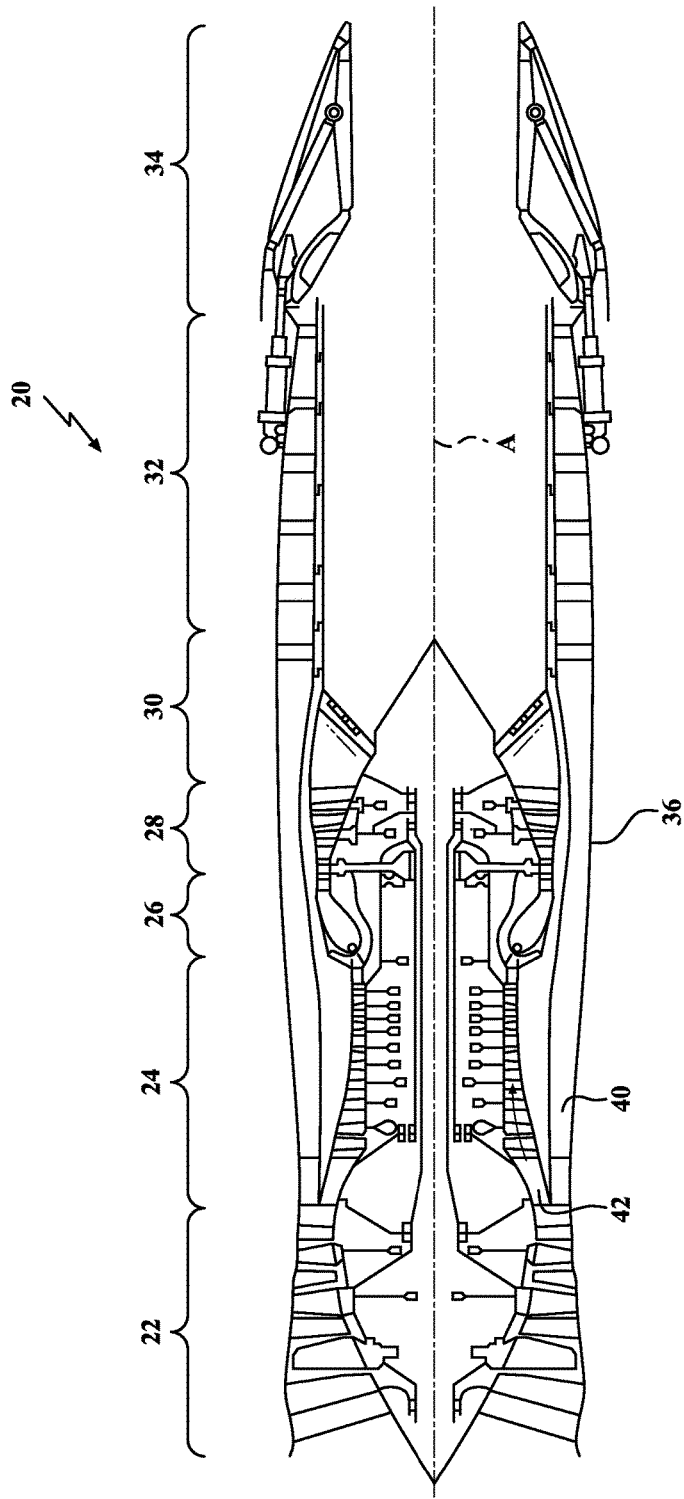
FIG. 1 is a schematic cross-section of one example aero gas turbine engine.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle system 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

An engine case structure 36 defines a generally annular secondary airflow path 40 around a core airflow path 42. It should be appreciated that various components, individually and collectively, may define the engine case structure 36 that essentially defines an exoskeleton to support the rotational hardware.

Air that enters the fan section 22 is divided between a core airflow through the core airflow path 42 and a secondary airflow through a secondary airflow path 40. The core airflow passes through the combustor section 26, the turbine section 28, then the augmentor section 30 where fuel may be selectively injected and burned to generate additional thrust through the nozzle system 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein may be any airflow different from the core airflow. The secondary airflow may ultimately be at least partially injected into the core airflow path 42 adjacent to the exhaust duct section 32 and the nozzle system 34.

The exhaust duct section 32 may be circular in cross-section as typical of an axisymmetric augmented low bypass turbofan or may be non-axisymmetric in cross-section to include, but not be limited to, a serpentine shape to block direct view to the turbine section 28. In addition to the various cross-sections and the various longitudinal shapes, the exhaust duct section 32 may terminate in a Convergent/Divergent (C/D) nozzle system, a non-axisymmetric two-dimensional (2D) C/D vectorable nozzle system, a flattened slot nozzle of high aspect ratio or other nozzle arrangement.

Figure 2:
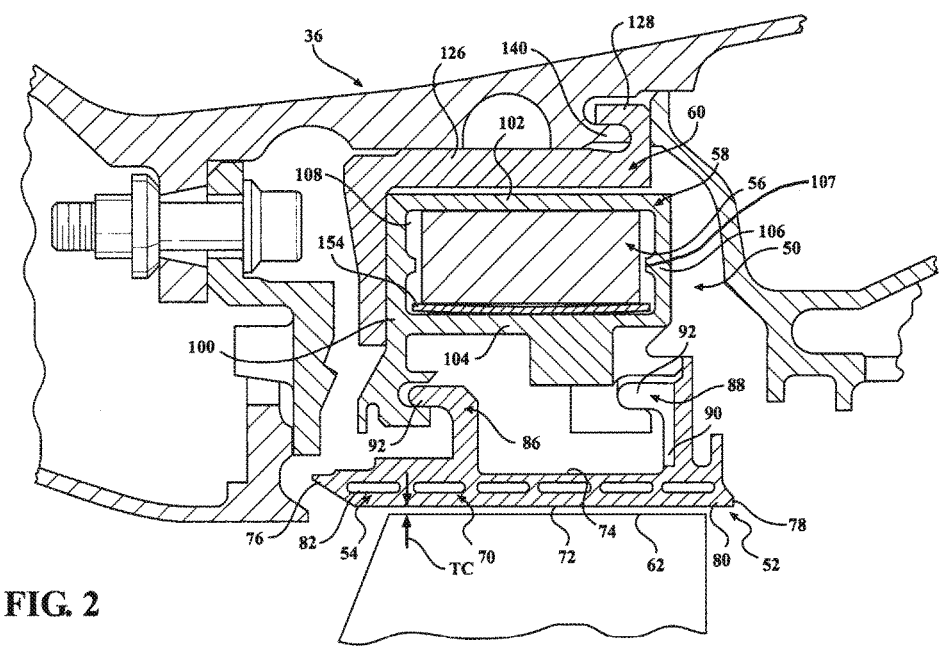
FIG. 2 is an enlarged sectional view of a clearance control system according to one disclosed non-limiting embodiment.

With reference to FIG. 2, a blade tip clearance control system 50 includes a radially adjustable blade outer air seal (BOAS) system 52 that operates to control blade tip clearances inside for example, the turbine section 28 (FIG. 1), however, other sections may also benefit herefrom. The radially adjustable BOAS system 52 may be arranged around each or particular stages within the gas turbine engine 20. That is, each rotor stage may have an independently radially adjustable BOAS system 52.

Figure 3:
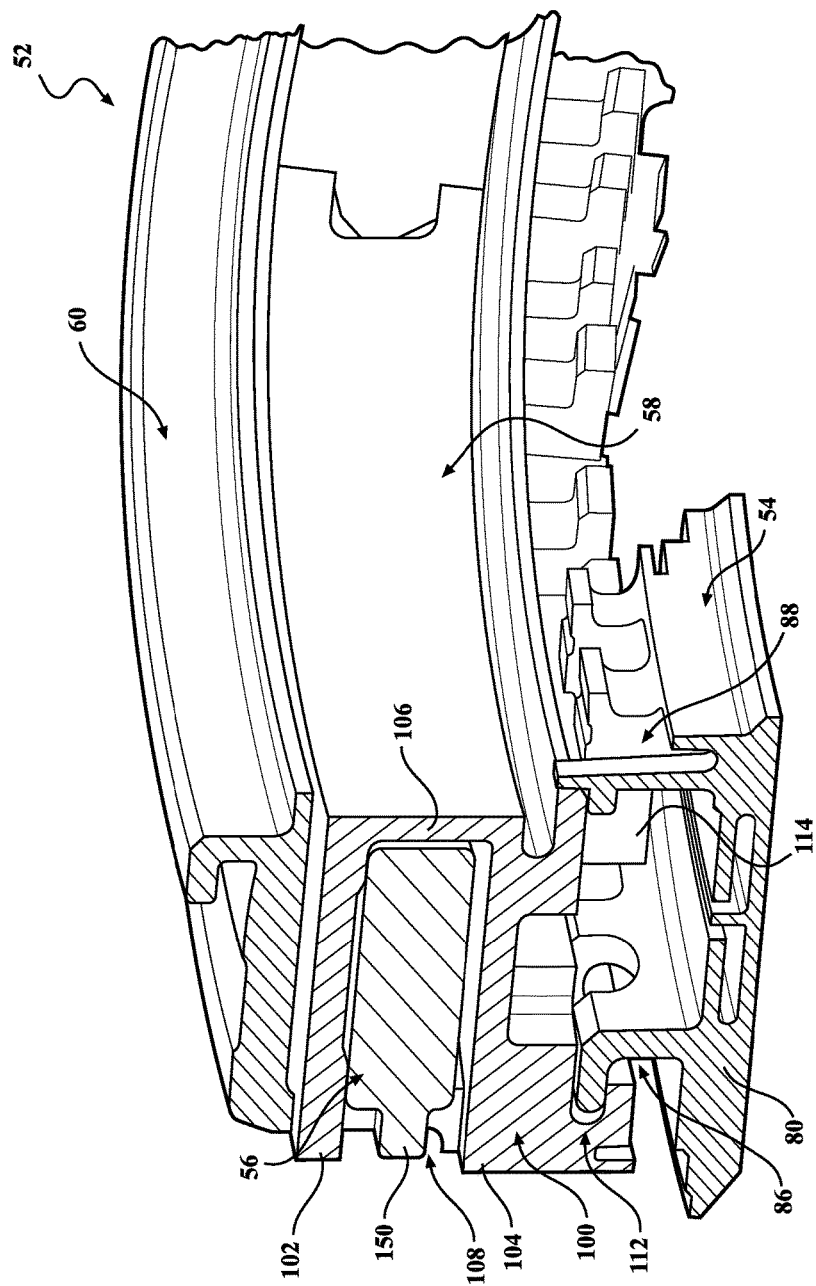
FIG. 3 is a rear partial perspective view of a portion of the clearance control system.

The BOAS system 52 locally bounds the radially outboard extreme of the core flowpath through the engine. Each BOAS system 52 generally includes a multiple of BOAS 54, a full hoop thermal control ring 56, a full hoop BOAS carrier ring 58 and a containment ring 60. In one disclosed non-limiting embodiment, the full hoop BOAS carrier ring 58 is generally "C" shaped in cross-section (FIG. 3).

A circumferential array of the BOAS 54 accommodates potential interaction with the rotating blade tips 62. Each BOAS 54 generally includes a main body 70 with an inner surface 72 and an outer surface 74. The main body 70 extends from an upstream end 76 to a downstream end 78 and has a first and a second circumferential edge surface 80. Each of the circumferential edge surfaces 80 may include internal cooling passages 82. With the array assembled, adjacent circumferential edge surfaces 80 of adjacent BOAS 54 come into facial alignment with each other to seal the gas path adjacent to the blade tips 62.

Radially outboard of the outer surface 74, each BOAS 54 may include a forward feature 86 and an aft feature 88. The features 86, 88 in this disclosed non-limiting embodiment are lugs with a radially outward projecting leg portion 90 and an axially projecting distal portion 92 that extends, for example, axially forward for the forward feature 86 and axially forward for the aft feature 88. Each BOAS 54 may have a pair of such fore and aft features (FIG. 3). Each BOAS 54 may also have an internal cooling passage system and a thermal barrier coating.

The full hoop BOAS carrier ring 58 may be manufactured of a relatively high Coefficient of Thermal Expansion (CTE) material, e.g., a metal alloy such as a nickel-based superalloy. Relatively high CTE materials include alloys such as nickel-based superalloys, e.g., AMS5663, INCO 718, or others. Relatively low CTE materials include ceramics and ceramic matrix composites (CMC). As defined herein, the low CTE material will have a lower thermal conductivity than the high CTE material.

Figure 4:
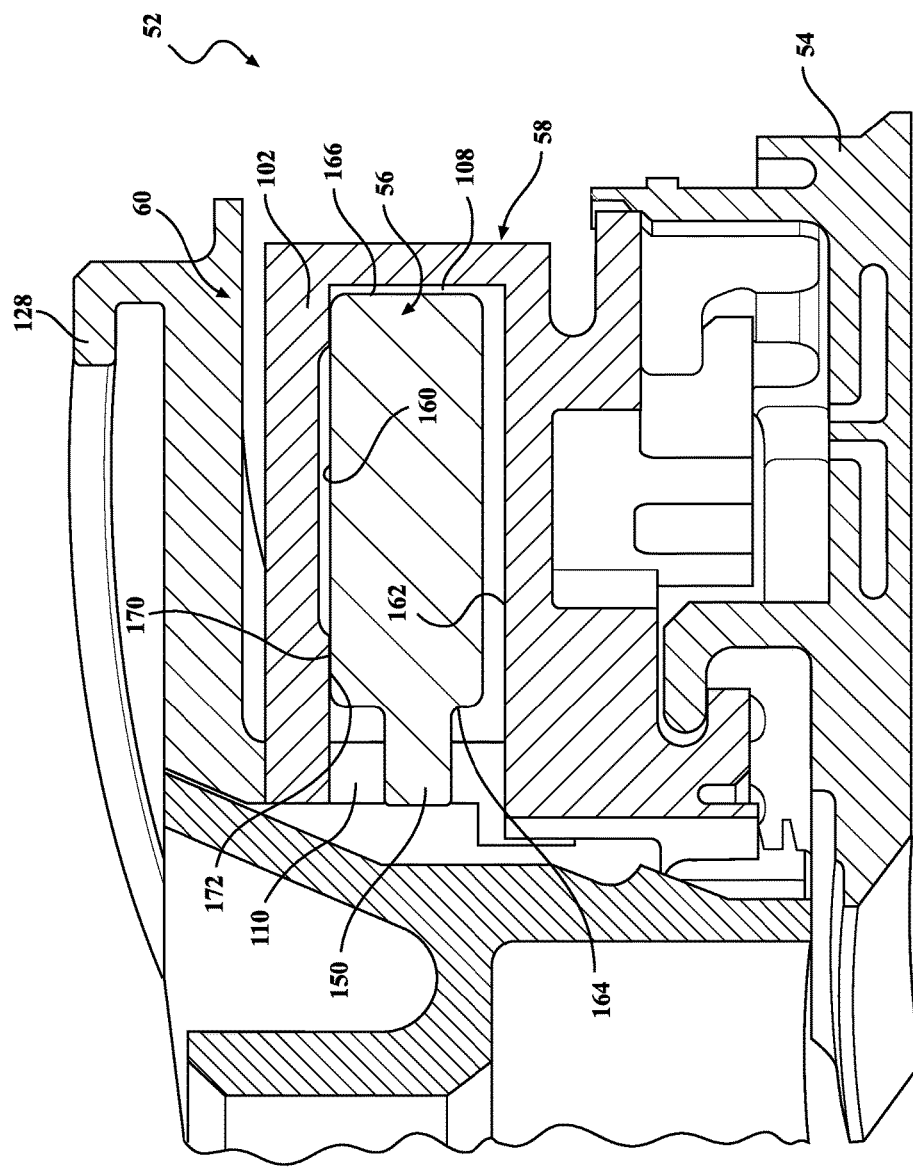
FIG. 4 is a front partial perspective view of a portion of the clearance control system.

The full hoop BOAS carrier ring 58 generally includes a main body 100 that is of a generally rectilinear "C" shape in cross-section. In one disclosed non-limiting embodiment, the main body 100 includes an outer wall 102 and an inner wall 104 interconnected by a radially extending wall 106 therebetween to form a generally rectilinear compartment 108 that may be enclosed by a cover 110 that may be formed by the containment ring 60 (FIG. 4). Each of the radially extending walls 106 may include a respective extension 107 to facilitate maintaining a relationship of the full hoop thermal control ring 56. Alternatively, or in addition, the full hoop thermal control ring 56 may include an axial extension 150 at least partially received in the cover 110 to maintain the relationship thereof.

Figure 5:
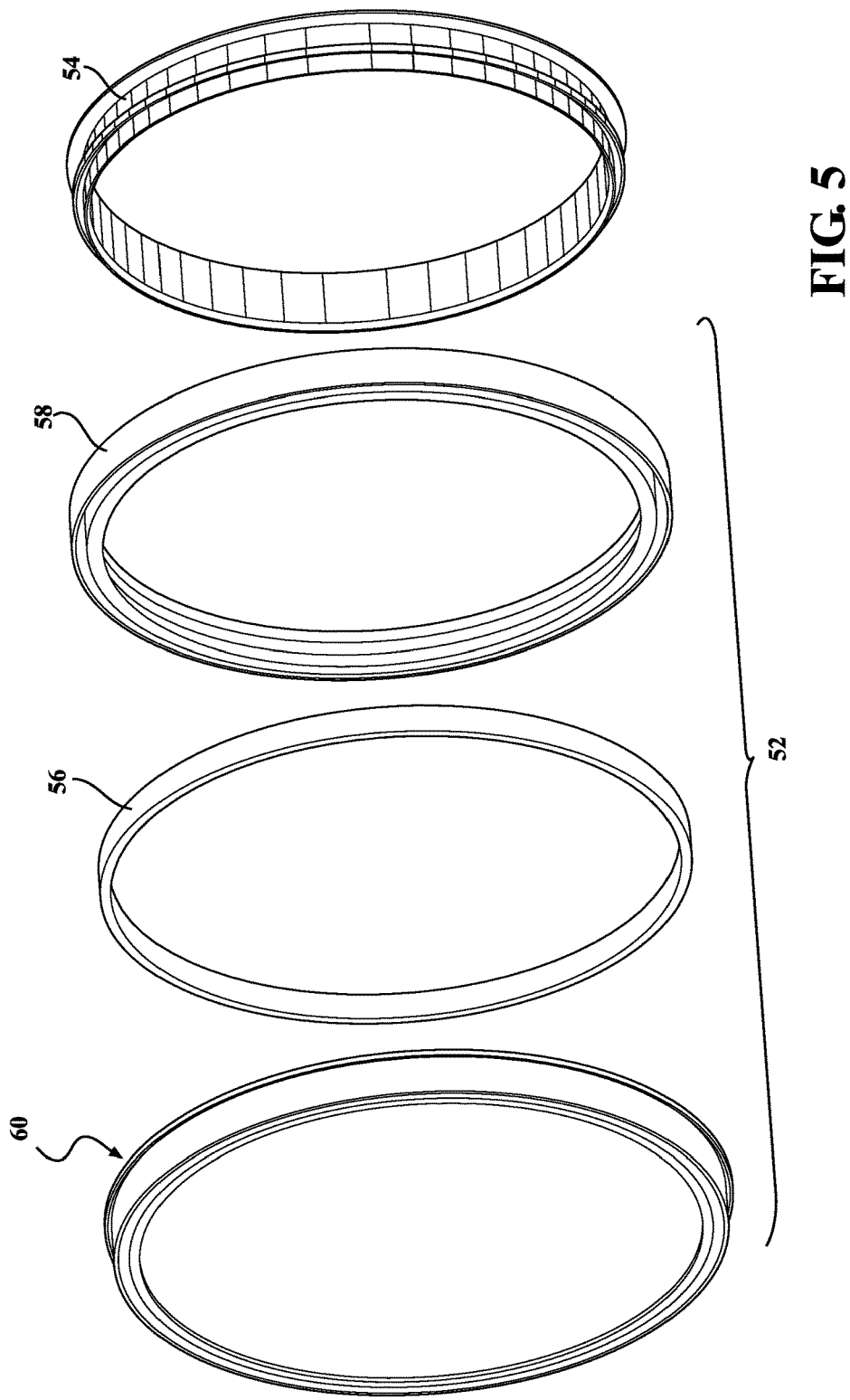
FIG. 5 is an exploded view of the clearance control system according to one disclosed non-limiting embodiment.

The inner wall 104 of the main body 100 of the full hoop BOAS carrier ring 58 includes a forward feature 112 and an aft feature 114 that respectively engage the reciprocally directed BOAS forward and aft features 86, 88. That is, each of the circumferentially arranged BOAS 54 are supported as an array within the full hoop BOAS carrier ring 58 (FIG. 5).

An axial wall 126 of the containment ring 60 includes an interface feature 128 such as lug that is received within a respective support 140 that extends from the engine case structure 36 such as a turbine case or diffuser case. The support 140 may be a flange or other continuous or segmented structure to support the containment ring 60 and thus the BOAS system 52.

In this disclosed non-limiting embodiment, the full hoop BOAS carrier ring 58 is axially retained and supported for expansion and contraction by the containment ring 60. It should be appreciated that various interface arrangements such as circumferentially segmented arrangement may alternatively or additionally be provided to facilitate assembly.

The full hoop thermal control ring 56 is manufactured of a material with a CTE different than that of the full hoop BOAS carrier ring 58. The full hoop thermal control ring 56 may be a solid or hollow ring manufactured of a low CTE material such as HAYNES 242, which is an age-hardenable Ni-Mo-Cr alloy. The full hoop thermal control ring 56 is operable to control relatively higher CTE components such as the full hoop BOAS carrier ring 58. The response of the thermal control ring 56 in other disclosed non-limiting embodiments may be further controlled by other structure such as, for example, a heat shield and/or a thermal barrier coating. That is, various other components and or systems such as air flow may be utilized to change the transient response of the full hoop thermal control ring 56 to operational conditions.

The full hoop thermal control ring 56 is located within the generally rectilinear compartment 108 of the full hoop BOAS carrier ring 58. In this disclosed non-limiting embodiment, a spring 154 is located between the full hoop thermal control ring 56 and the inner wall 104 of the main body 100 of the full hoop BOAS carrier ring 58. The spring 154 facilitates maintenance of a bias between the full hoop thermal control ring 56 and the full hoop BOAS carrier ring 58 when the full hoop thermal control ring 56 contracts from the outer wall 102 of the main body 100.

With reference to FIG. 4, the full hoop thermal control ring 56 is generally rectilinear in cross-section and includes an outer surface 160 and an inner surface 162 with radial surfaces 164, 166 therebetween such that the full hoop thermal control ring 56 fits within the rectilinear compartment 108. The full hoop BOAS carrier ring 58 is of a slightly smaller diameter than the full hoop thermal control ring 56. At assembly and low thermal operating conditions, an interference fit 170 is formed between an inner surface 172 of the full hoop BOAS carrier ring 58 outer wall 102, and the outer surface 160 of the full hoop thermal control ring 56. In one example, the interference fit 170 is about 14 mil (0.014 inch; 0.3556 mm) on the radius of a 30 inch (762 mm) diameter full hoop thermal control ring 56.

Engine operation influences the radial thermal expansion of the thermal control ring 56 and the radial position of the full hoop BOAS carrier ring 58 to thereby adjust the radial position of the BOAS 54. Such expansion, relative to combined thermal and centrifugal expansion of the associated rotor blade tips 62, controls the change in radial tip clearance (FIG. 2). In this manner, local temperature conditions around the engine case are harnessed to passively control radial tip clearances. Alternatively or in addition, radial movement of the array of BOAS 54 may also be limited between mechanical stops. The required displacement is, at least partially, a function of the engine core size and the dynamic conditions of a particular application. Accordingly, the thermal control ring 56 may be designed with anticipated non-equilibrium situations in mind. In general, radial tip clearance decreases with engine power because, for example, the turbine rotor is subject to both thermal expansion and centrifugal/inertial expansion, whereas the thermal control ring 56 is subject primarily to thermal expansion. It should be appreciated that the thermal control ring 56 may also be subject other effects such as engine pressures in the form of BOAS load that may also be accounted for with respect to radial growth.

Figure 6:
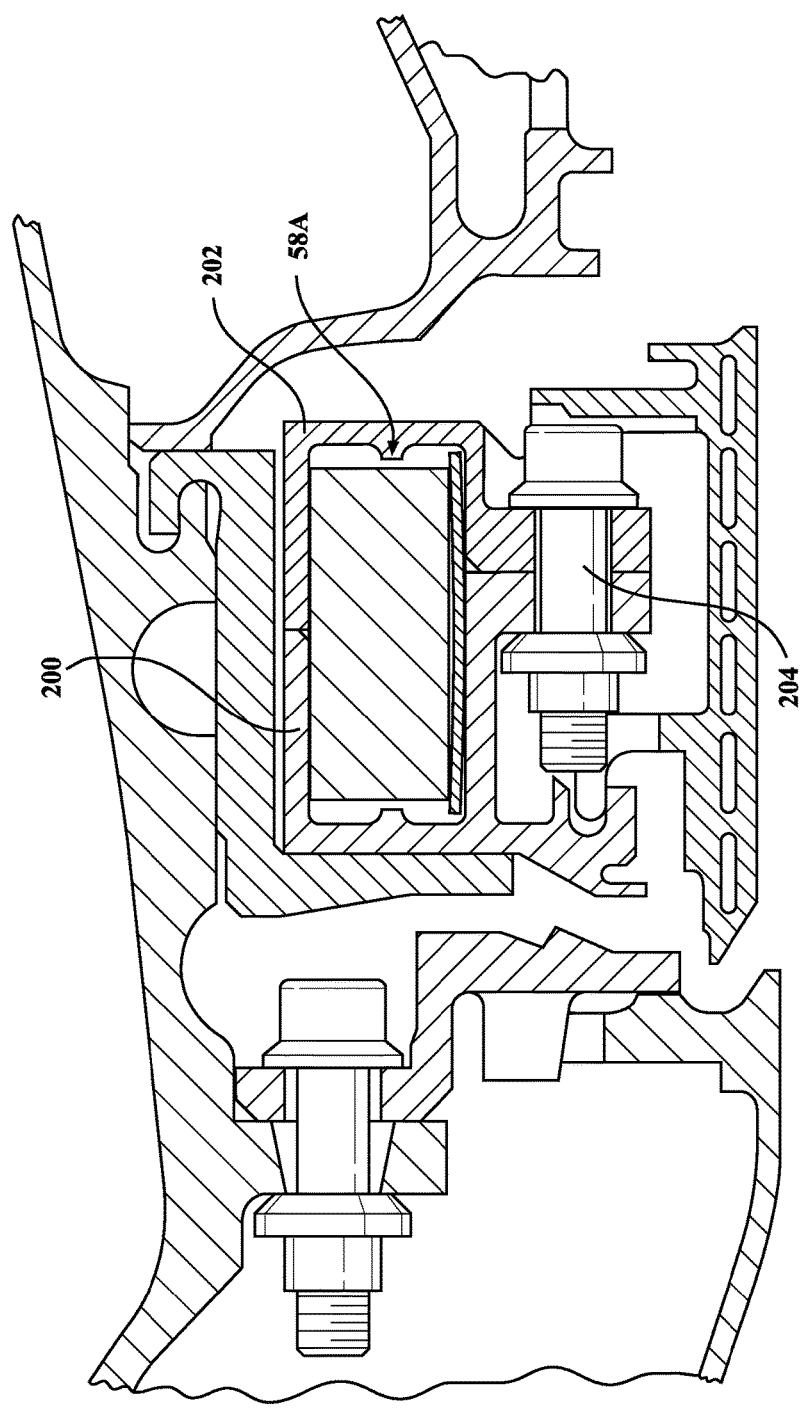
FIG. 6 is an enlarged sectional view of a clearance control system according to another disclosed non-limiting embodiment.

With reference to FIG. 6, the full hoop BOAS carrier ring 58A according to another disclosed non-limiting embodiment is of a clamshell configuration. The full hoop BOAS carrier ring 58A includes a forward ring 200 and an aft ring 202 that is retained together by a multiple of fasteners 204 (one shown) to contain the full hoop thermal control ring 56.

The non-segmented design of the full hoop BOAS carrier ring 58 is relatively straightforward to manufacture to the high tolerances required to effectively control blade tip clearance as well as eliminate stability issues at the otherwise segmented carrier interfaces that may disadvantageously result in non-circular support of the BOAS and potential blade tip rub.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A clearance control system for a gas turbine engine, comprising:
    a full hoop blade outer air seal carrier ring that forms a generally rectilinear compartment;
    a full hoop thermal control ring at least partially contained within the generally rectilinear compartment of said full hoop blade outer air seal carrier ring, the full hoop blade outer air seal carrier ring is of a slightly smaller diameter than the full hoop thermal control ring to form an interference fit therebetween; and
    a multiple of blade outer air seals mounted to said full hoop blade outer air seal carrier ring.

2. The system as recited in claim 1, wherein said interference fit is at assembly.

3. The system as recited in claim 1, wherein said interference fit is about 14 mil (0.014 inch; 0.3556 mm) on a radius of a 30 inch (762 mm) diameter full hoop thermal control ring.

4. The system as recited in claim 1, wherein said interference fit is between an inner surface of said full hoop blade outer air seal carrier ring and an outer surface of said full hoop thermal control ring.

5. The system as recited in claim 1, wherein said multiple of blade outer air seals locally bound a core flowpath through the gas turbine engine.

6. The system as recited in claim 1, further comprising a containment ring that interfaces with said full hoop blade outer air seal carrier ring.

7. The system as recited in claim 6, wherein said containment ring interfaces with a case of the gas turbine engine.

8. The system as recited in claim 6, wherein said containment ring interfaces with a turbine case of the gas turbine engine.

9. The system as recited in claim 1, wherein said full hoop blade outer air seal carrier ring includes a main body with an outer wall and an inner wall interconnected by a radially extending wall, said interference fit between an inner surface of said outer wall of said full hoop blade outer air seal carrier ring, and an outer surface of said full hoop thermal control ring.

10. The system as recited in claim 9, wherein said full hoop blade outer air seal carrier ring inner wall forms a forward feature and an aft feature that engage said multiple of blade outer air seals.

11. The system as recited in claim 9, further comprising an extension on said radially extending wall to facilitate maintaining a relationship of the full hoop thermal control ring within the full hoop blade outer air seal carrier ring.

12. The system as recited in claim 1, further comprising a spring located between said full hoop thermal control ring and an inner wall of said full hoop blade outer air seal carrier ring to maintain a bias between said full hoop thermal control ring and said full hoop blade outer air seal carrier ring.

13. A clearance control system for a gas turbine engine, comprising:
    a containment ring;
    a full hoop blade outer air seal carrier that interfaces with said containment ring; and
    a full hoop thermal control ring at least partially contained said full hoop blade outer air seal carrier ring, the full hoop blade outer air seal carrier ring is of a slightly smaller diameter than the full hoop thermal control ring to form an interference fit therebetween; and
    further comprising a cover that encloses a generally rectilinear compartment.

14. The system as recited in claim 13, further comprising a multiple of blade outer air seals mounted to said full hoop blade outer air seal carrier ring.

15. The system as recited in claim 13, wherein said containment ring interfaces with a case of the gas turbine engine.

16. The system as recited in claim 13, wherein said interference fit is at assembly between an inner surface of said full hoop blade outer air seal carrier ring and an outer surface of said full hoop thermal control ring.

17. The system as recited in claim 13, wherein the cover is formed by the containment ring.

18. The system as recited in claim 17, wherein the full hoop thermal control ring includes an axial extension at least partially received in said cover to maintain a relationship therebetween.

19. A method of assembling a clearance control system for a gas turbine engine, comprising:
    assembling a full hoop thermal control ring at least partially within a full hoop blade outer air seal carrier ring, the full hoop blade outer air seal carrier ring is of a slightly smaller diameter than the full hoop thermal control ring to form an interference fit therebetween at assembly; and
    enclosing the full hoop thermal control ring within a generally rectilinear compartment formed by the full hoop blade outer air seal carrier ring.

20. The method as recited in claim 19, further comprising: assembling the full hoop blade outer air seal carrier ring to a containment ring.

* * * * *